June 23, 1970   R. F. UDELL ET AL   3,516,252
FUEL MANIFOLD SYSTEM
Filed Feb. 26, 1969   2 Sheets-Sheet 1
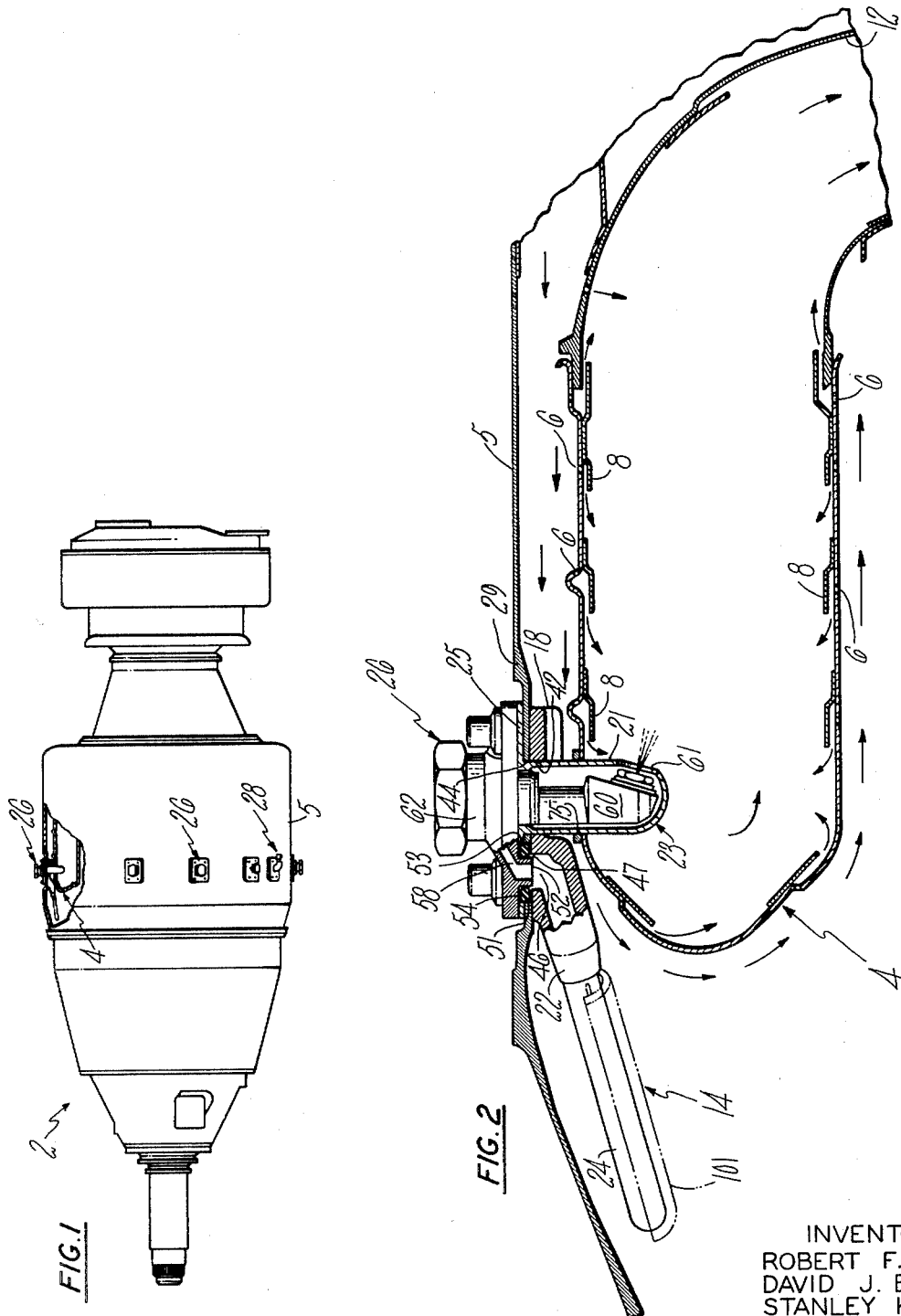
INVENTORS
ROBERT F. UDELL
DAVID J. BEANE
STANLEY KRIEGER
BY *Jack N. M. Carthy*
AGENT

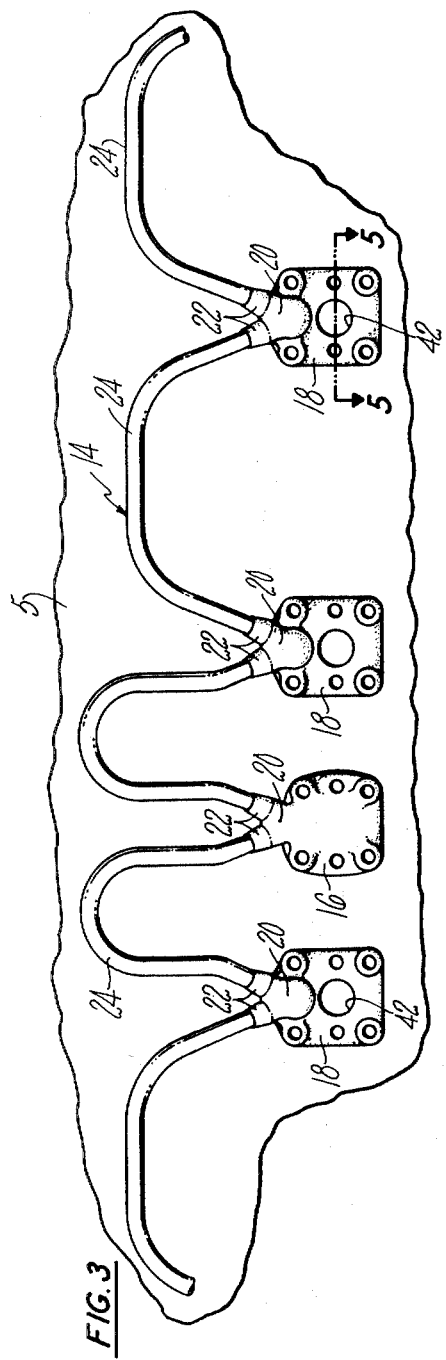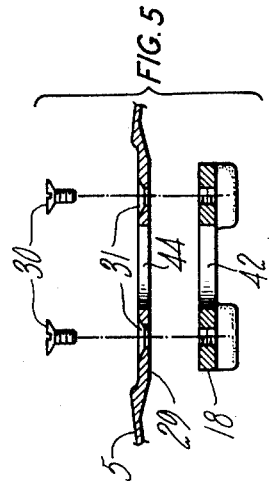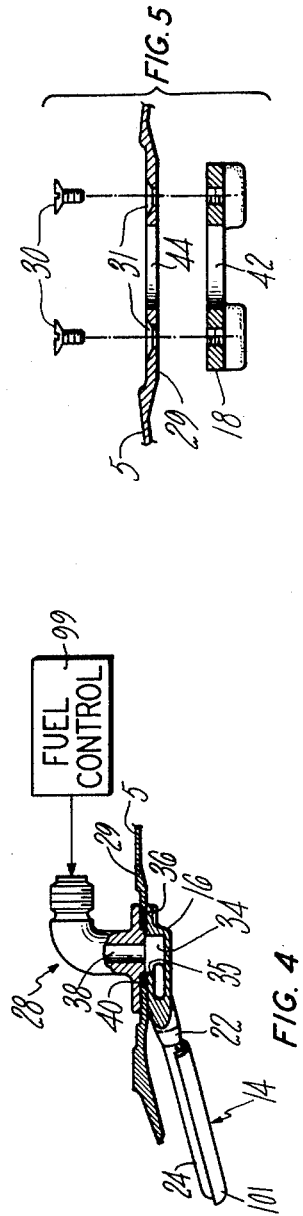

United States Patent Office 3,516,252
Patented June 23, 1970

3,516,252
FUEL MANIFOLD SYSTEM
Robert F. Udell and David J. Beane, North Palm Beach, and Stanley Krieger, Riviera Beach, Fla., assignors to United Aircraft Corporation, East Hartford, Conn., a corporation of Delaware
Filed Feb. 26, 1969, Ser. No. 802,428
Int. Cl. F02c 7/22
U.S. Cl. 60—39.74                               10 Claims

ABSTRACT OF THE DISCLOSURE

A gas turbine engine having a fuel manifold located around the interior of the engine casing, said manifold being made up of a plurality of short sections of tubing with mounting means connecting the adjacent ends of each tubing to the casing. Fuel nozzles cooperate with the mounting means so that each nozzle can be installed or removed without disturbing the fuel manifold. Fuel inlet means cooperate with a mounting means at a bottom location to provide for directing fuel into the manifold. Said sections of tubing being in U-section to provide for any changes in size due to thermal gradients. A nozzle shield is provided for each nozzle and this shield protects the nozzle from the combustion chamber heat and also serves to support the combustion chamber. A shield may also be provided around the short sections of tubing in the event of needed protection from the combustion chamber.

---

The invention herein described was made in the course of or under a contract with the Department of the Army.

Background of the invention

This invention relates to fuel manifold means, and in the past most manifolds were made to be mounted on the exterior of the engine casing and in such a manner that it had to be disassembled to work on the fuel nozzles and other engine parts. Such a system is shown in U.S. Pat. No. 3,152,443.

Summary of the invention

A primary objective of the invention is to provide a fuel manifold system whereby fuel nozzles are easily removable from the exterior of the engine and do not disturb the integrity of the fuel manifold.

In accordance with the present invention, the manifold is mounted within the engine casing and while providing for easy removal of each of the fuel nozzles, it also is shielded from damage by the engine casing.

In accordance with a further aspect of the present invention the tubing making up the manifold can be heatshielded by having shields mounted on the tubing by standoffs brazed thereto. This provides an airspace between the heatshield and the tubing.

In accordance with this invention an inlet means is provided which can be used as a manifold to drain since the inlet is adjacent the lowest point in the manifold assembly. If desired it can be made the lowest point.

Brief description of the drawings

FIG. 1 is a view of a gas turbine power plant having the outer housing broken away to show a combustion chamber and part of the fuel manifold system.

FIG. 2 is an enlarged view of the combustion chamber and fuel manifold system.

FIG. 3 is a view from within the engine showing a portion of the fuel manifold system with the fuel nozzles removed.

FIG. 4 is a view of an inlet connection to the fuel manifold system.

FIG. 5 is a view showing how the engine casing is reinforced to support the fuel manifold system and how mounting members are retained while nozzles are removed.

Description of the preferred embodiment

Referring to FIG. 1, the gas turbine power plant 2 is of the type shown in U.S. Pat. No. 3,152,443. The air flows from a source to an area around the annular combustion chamber 4. This chamber 4 has openings 6 throughout for the passage of air thereinto from said area. Baffles 8 are provided to obtain a better mixing of the air being admitted with the fuel being injected. The mixture of fuel and air is ignited and the gases from this mixture pass through the exit 12.

The fuel manifold system 14 comprises: (1) a plurality of mounting members 16 and 18 circumferentially spaced around the inner side of the engine casing 5, (2) each member, 16 and 18, contains a fitting 20 having two short tube extensions 22 extending therefrom, (3) U-shaped tube sections 24 connect adjacent short tube extensions 22, (4) a nozzle heatshield cover 23 cooperates with each mounting member 18, (5) a fuel nozzle assembly 26 cooperates with each nozzle heatshield cover 23, and (6) an inlet connector 28 cooperates with each mounting member 16.

Mounting members 16 and 18 and fixed in position on the interior of the casing 5 at locations 29 which are formed of extra thickness such as shown in FIG. 5. Each mounting member is fixed at its cooperating strengthened location by bolts 30 which pass through openings 31 in the strengthened section and threadably engage the mounting member.

Each mounting member 16 has a chamber 34 therein which is connected with the inner ends of the short tube extensions 22. An opening 35 extends through the surface of the mounting member which mates with the strengthened section of the casing 5 and enters the chamber 34. A concentric larger opening 36 is provide in the cooperating strengthened section which encompasses opening 35. The inlet connector 28 has a flat mating surface for engaging the outer surface of the cooperating strengthened location 29. An annular projection extends from said flat mating surface from around a passageway 38 extending through the connector. This projection extends into the opening 36 and projects towards the surface of mounting member 16 around its edge of opening 35. A seal ring 40 is located in the annular space formed in the opening 36 between the mounting member 16 and inlet connector 28. Each inlet connector 28 is bolted at four corner locations through holes in the cooperating strengthened location to its mounting member 16. A fuel control 99 diverts fuel to the passageway 38 of each inlet connector 28.

Mounting member 18 has an opening 42 therethrough and in position mates with a similar sized opening 44 in the cooperating strengthened location 29. Each mounting member 18 also has a small chamber 46 therein which is connected with the inner ends of the short tube extensions 22. An opening 47 extends through the surface of the mounting member which mates with its strengthened sections of the casing 5 and enters the chamber 46. When mounting member 18 is in position, opening 47 is concentrically positioned with a larger opening 51 located in the cooperating strengthened location 29.

The U-shaped tube sections 24 which extend between adjacent short tube extensions 22, extend in a direction away from the combustion chamber 4 and in the same direction as the short tube extensions 22. The short tube extensions 22 are angled to permit as much distance as possible between the combustion chamber and tube sections without having interference between the tube sections and the casing. In the event that U-shaped tube sections 24 are still subjected to too much heat, heatshields 101 can be placed over the tube sections to provide an airspace therebetween. The heatshields can be attached to the tube sections by any means desired such as by a plurality of standoff members. It is noted that with the heatshields arranged in this manner they are subjected to air flow adjacent the casing which is cooler than that nearer the combustion chamber. The tube sections are U-shaped primarily to provide expansion loops so that the tubes are not broken by the thermal expansion of the casing.

A heatshield cover 23 comprises a hollow projection 21 and a base plate 25. Each projection 21 in its assembled position extends through the openings 44 and 42 of a cooperating mounting member and strengthened location and through an opening 75 in the end of the combustion chamber 4 to project thereinto. Each of its projections 21 has a sliding fit with its cooperating opening 75 to provide for its main support of the annular combustion chamber 4. It can be seen that with the proper fit the projections 21 located at a plurality of points around the orifice casing will support and center the annular chamber 4. The base plate 25 engages the cooperating outer surface of the strengthened location 29 of the casing. This base plate has an opening 53 which mates with opening 51 and is of the same size.

The nozzle assembly 26 has a nozzle 60 extending from a base housing 62. The nozzle 60 projects from a flat surface on the housing and is adapted to project into the heatshield projection 21. The flat surface of the base engages the base plate 25 and is fixed in position. Each nozzle assembly 26 is bolted at four corner locations through holes in the base plate 25 and cooperating strengthened location to its mounting member 18. An annular projection 52 extends through openings 51 and 53 to a point adjacent to the opening 47. A seal 54 is provided at this point being located around the annular projection in the annular space formed by the openings 51 and 53, mounting member 18, and nozzle assembly 26. A passageway 58 connects the inner surface of said annular projection 52 to said nozzle to direct fuel thereto. An opening 61 is located in said projection 21 around the fuel injecting orifice of the nozzle 60.

We claim:
1. In combination in a gas turbine engine, an engine casing, a combustion chamber means in said casing, fuel manifold means extending around the inner side of the engine casing, means connecting said fuel manifold means to said casing, said engine casing having a plurality of first opening means therearound located adjacent said fuel manifold means, fuel nozzle means being connected to said casing adjacent each first opening means, each fuel nozzle means having a surface engaging the outer side of the engine casing and a projection extending through its cooperating adjacent first opening means into said combustion chamber means, said engine casing having a plurality of second opening means therearound, each second opening means being adjacent a first opening means and entering into said manifold means, each fuel nozzle means having a passageway connecting it to the fuel manifold through its cooperating second opening means, each fuel nozzle means being removable from the outer side of said engine casing.

2. A combination as set forth in claim 1 wherein said means connecting said fuel manifold to said casing includes a plurality of mounting units located around said casing, a first and second opening means is associated with each mounting unit.

3. A combination as set forth in claim 2 wherein said fuel manifold means includes tubular members extending between adjacent mounting units.

4. A combination as set forth in claim 3 wherein each mounting unit has a small chamber with two connecting means extending therefrom, each tubular member extending between adjacent mounting units having an end connected to a connecting means of adjacent mounting units.

5. A combination as set forth in claim 2 wherein each mounting unit includes a small chamber forming a part of the manifold means, each fuel nozzle means having its passageway connected to the small chamber of its cooperating mounting unit.

6. A combination as set forth in claim 3 wherein said tubular members are connected to the casing only through said mounting units, said tubular members being U-shaped to provide for relative movement between the tubular members and the mounting units.

7. In combination in a gas turbine engine, an engine casing, combustion chamber means in said casing, a fuel manifold system mounted on said casing, said fuel manifold system including conduit means located around the inner side of the engine casing, mounting means for connecting said conduit means to said casing, said mounting means comprising a plurality of mounting members fixed to said casing, removable fuel nozzle means connected to at least one of said mounting members for directing fuel to said combustion chamber, fuel inlet means connected to at least one of said mounting members for directing fuel to said conduit means.

8. In combination in a gas turbine engine, an engine casing, combustion chamber means in said casing, a fuel manifold system mounted on said casing, said fuel manifold system including a plurality of conduit means located around the inner side of the engine casing, mounting means for connecting said conduit means to said casing and to each other, said mounting means comprising a plurality of first mounting members fixed to said casing, independently removable fuel nozzle means for said combustion chamber connected to each of said first mounting members, said mounting means comprising at least one second mounting member fixed to said casing, fuel inlet means connected to said second mounting member.

9. A combination as set forth in claim 8 wherein the conduit means comprises a tubular section connecting adjacent mounting members.

10. A combination as set forth in claim 8 wherein each of said nozzle means is inserted into its respective first mounting member from the exterior of the casing.

References Cited

UNITED STATES PATENTS

| 2,410,450 | 11/1946 | Kroon | 60—39.31 |
| 2,686,401 | 8/1954 | Newcomb | 60—39.74 |
| 2,963,857 | 12/1960 | Egbert | 60—39.74 |
| 3,152,443 | 10/1964 | Newland | 60—39.16 |

DOUGLAS HART, Primary Examiner